(12) United States Patent
Kumar et al.

(10) Patent No.: US 7,618,731 B2
(45) Date of Patent: Nov. 17, 2009

(54) CERAMIC-CERAMIC NANOCOMPOSITE ELECTROLYTE

(75) Inventors: Binod Kumar, Dayton, OH (US); Christina H. Chen, Beavercreek, OH (US)

(73) Assignee: University of Dayton, Dayton, OH (US)

( * ) Notice: Subject to any disclaimer, the term of this patent is extended or adjusted under 35 U.S.C. 154(b) by 246 days.

(21) Appl. No.: 11/016,253

(22) Filed: Dec. 17, 2004

(65) Prior Publication Data

US 2005/0214616 A1    Sep. 29, 2005

Related U.S. Application Data

(60) Provisional application No. 60/530,275, filed on Dec. 17, 2003.

(51) Int. Cl.
*H01M 8/10* (2006.01)
(52) U.S. Cl. .......................... 429/33; 501/103
(58) Field of Classification Search ................. 501/103, 501/105, 152; 429/30, 33, 188
See application file for complete search history.

(56) References Cited

U.S. PATENT DOCUMENTS

| | | | | |
|---|---|---|---|---|
| 5,130,210 A | * | 7/1992 | Iwasaki et al. ................. | 429/33 |
| 6,087,285 A | * | 7/2000 | Oomichi et al. ............. | 501/103 |
| 2003/0047802 A1 | * | 3/2003 | Hiramatsu et al. .......... | 257/703 |
| 2004/0197628 A1 | * | 10/2004 | Yoshikata et al. ............. | 429/30 |

OTHER PUBLICATIONS

Kumar, Binod et al., "Electrical properties of heterogeneously doped yttria stabilized zirconia" Journal of Power Sources, published Jan. 10, 2005, pp. 12-20, vol. 140.

* cited by examiner

*Primary Examiner*—Patrick Ryan
*Assistant Examiner*—Monique Wills
(74) *Attorney, Agent, or Firm*—Dinsmore & Shohl LLP

(57) ABSTRACT

A ceramic-ceramic nanocomposite electrolyte having enhanced conductivity is provided. The nancomposite electrolyte is formed from chemically stabilized zirconia such as yttria stabilized zirconia or scandia stabilized zirconia and a heterogeneous ceramic dopant material such as $Al_2O_3$, $TiO_2$, MgO, BN, or $Si_3N_4$. The nanocomposite electrolyte is formed by doping the chemically stabilized zirconia with the ceramic dopant material and pressing and sintering the composite. The resulting electrolyte has a bulk conductivity of from about 0.10 to about 0.50 S/cm at about 600° C. to about 900° C. and may be incorporated into a solid oxide fuel cell.

23 Claims, 5 Drawing Sheets

Grain Size vs. Al$_2$O$_3$ content (sintered at 1520°C for 4h)

(a) 8YSZ (b) 8YSZ + 4% $Al_2O_3$ (c) 8YSZ + 6% $Al_2O_3$ (d) 8YSZ + 10% $Al_2O_3$ (e) 8YSZ + 20% $Al_2O_3$

Normalized Conductivity vs. Al₂O₃ content (a) Undoped 6ScSZ (b) 6ScSZ + 10% $Al_2O_3$ (c) 6ScSZ + 20 % $Al_2O_3$ (d) 6ScSZ + 30% $Al_2O_3$ ScSZ Grain size variation with $Al_2O_3$ additions in the sintered pellets The average conductivity of the samples measured at 850 and 900°C after correcting for the non conducting $Al_2O_3$ phase

CERAMIC-CERAMIC NANOCOMPOSITE ELECTROLYTE

CROSS REFERENCE TO RELATED APPLICATIONS

This application claims the benefit of U.S. Provisional Application No. 60/530,275 filed Dec. 17, 2003.

BACKGROUND OF THE INVENTION

The present invention relates to a ceramic-ceramic nanocomposite electrolyte having enhanced conductivity which may be used as an electrolyte in a solid oxide fuel cell.

The use of fuel cells has been widely increasing as fuel cells offer a clean, low pollution technology to provide electricity at high efficiencies. Of particular interest has been the use of solid electrolyte fuel cells which have demonstrated elevated energy production efficiency, high power density, and low levels of $NO_x$ and $SO_x$ emissions. Solid oxide fuel cells (SOFC) typically comprise two porous electrodes separated by a dense oxide ion-conducting electrolyte. Oxygen gas supplied at the cathode interacts with electrons to form oxygen ions which migrate through the electrolyte to the anode. However, solid oxide fuel cells suffer from a number of disadvantages including thermally induced stress resulting from their high operating temperature (1000° C.), cell fracture, and accelerated chemical interaction among components, which can lead to cell failure.

This is believed to be due to the fact that the electrolytes in current SOFCs typically comprise homogeneously doped stabilized zirconia, i.e., the cubic grains of stabilized zirconia are believed to be uniformly dispersed within grain boundaries which lowers the bulk conductivity of the electrolyte due to the lower conductivity of the grain boundaries. In addition, homogeneously doped stabilized zirconia must be heated to high temperatures (about 900-1000° C.) in order to exhibit significant oxygen ion conductivity useful for fuel cell applications.

In order to ensure the durability of the fuel cells and to reduce their operating temperature, the electrolytes used in the fuel cells must exhibit high conductivity, high mechanical strength, and high fracture toughness.

Accordingly, there is still a need in the art for an electrolyte for use in solid oxide fuel cells which provides high conductivity, lower operating temperatures, and good mechanical strength.

SUMMARY OF THE INVENTION

The present invention meets that need by providing a nanocomposite electrolyte having enhanced conductivity which may be used in a solid oxide fuel cell. The nanocomposite electrolyte is formed by heterogeneously doping chemically stabilized zirconia with a ceramic dopant material which remains physically distinct from the bulk structure and imparts an increase in ionic conductivity. The ceramic-ceramic nanocomposite electrolyte of the present invention, when incorporated into a solid oxide fuel cell, allows operation of the fuel cell at lower temperatures and provides improved power density, enhanced mechanical integrity, and reduced cost of power generation.

According to one aspect of the present invention, a ceramic-ceramic nanocomposite electrolyte is provided having a heterogeneous structure comprising chemically stabilized zirconia and a nanosize ceramic dopant material selected from $Al_2O_3$, $TiO_2$, MgO, BN, and $Si_3N_4$. By "chemically stabilized zirconia," it is meant that some of the zirconium sites in zirconium oxide are substituted with rare earth elements such as yttrium or scandium. Preferably, the chemically stabilized zirconia is selected from yttria stabilized zirconia and scandia stabilized zirconia.

In one embodiment of the invention, the nanocomposite electrolyte comprises from about 52% to about 99.9% by weight of the chemically stabilized zirconia and from about 0.1 to about 48% by weight of the nanosize ceramic dopant material.

Preferably, the nanosize ceramic dopant material comprises $Al_2O_3$. Where the chemically stabilized zirconia comprises yttrium stabilized zirconia, the electrolyte preferably comprises from about 60 to about 95% by weight yttrium stabilized zirconia and from about 5 to about 40% by weight $Al_2O_3$ Where the chemically stabilized zirconia comprises scandia stabilized zirconia, the electrolyte preferably comprises from about 60 to about 95% by weight scandia stabilized zirconia and from about 5 to 40% by weight $Al_2O_3$.

Preferably, the nanocomposite electrolyte has an average grain size of from about 0.1 to about 10 μm. The electrolyte has space charge regions at the grain boundary of the ceramic dopant material and the chemically stabilized zirconia. By "space charge regions," it is meant regions with significant electric fields occurring at the interface of the stabilized zirconia matrix and the ceramic dopant material. Such space charge regions are known to increase the transport of conducting ions, and thus increase conductivity.

The present invention also provides a method of making a ceramic-ceramic nanocomposite electrolyte comprising providing chemically stabilized zirconia; and heterogeneously doping the chemically stabilized zirconia with a ceramic dopant material. The chemically stabilized zirconia is preferably selected from yttria stabilized zirconia or scandia stabilized zirconia. The ceramic dopant material is preferably selected from the group consisting of $Al_2O_3$, $TiO_2$, MgO, BN, and $Si_3N_4$, and preferably comprises $Al_2O_3$. The chemically stabilized zirconia is preferably doped with an amount of ceramic dopant material sufficient to retard the grain growth of the chemically stabilized zirconia.

Preferably, the method further includes including pressing the doped chemically stabilized zirconia into a disc. The method also preferably further includes sintering the disc at a temperature of at least 1200° C. to 1600° C. After sintering, the nanocomposite electrolyte has a bulk conductivity of about 0.10 to about 0.50 S/cm at a temperature range of 600° C. to 900° C.

The nanocomposite electrolyte of the present invention is preferably incorporated into a solid oxide fuel cell. A solid oxide fuel cell containing the nanocomposite electrolyte preferably has an operating temperature of from about 600° C. to about 950° C. The nanocomposite electrolyte of the present invention may also be incorporated into an oxygen separator, an oxygen sensor, or an oxygen purifier.

Accordingly, it is a feature of the present invention to provide a ceramic-ceramic nanocomposite electrolyte having a heterogeneous structure which exhibits enhanced conductivity and which may be incorporated into a solid oxide fuel cell. This, and other features and advantages of the present invention will become apparent from the following detailed description and the accompanying drawings.

DETAILED DESCRIPTION OF THE PREFERRED EMBODIMENT

Figure 3:
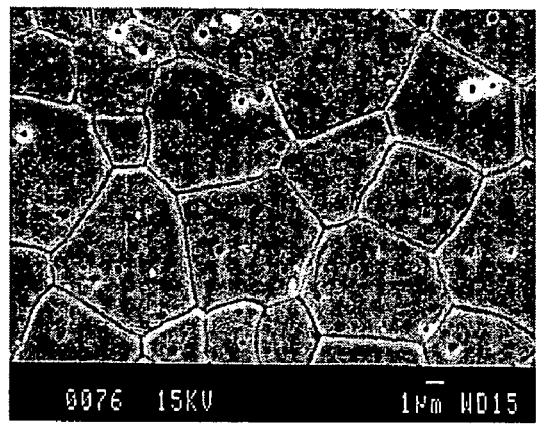
FIGS. 3(a) to 3(e) illustrate the microstructure of YSZ/$Al_2O_3$ nanocomposites containing varying amounts of $Al_2O_3$.
Figure 3:
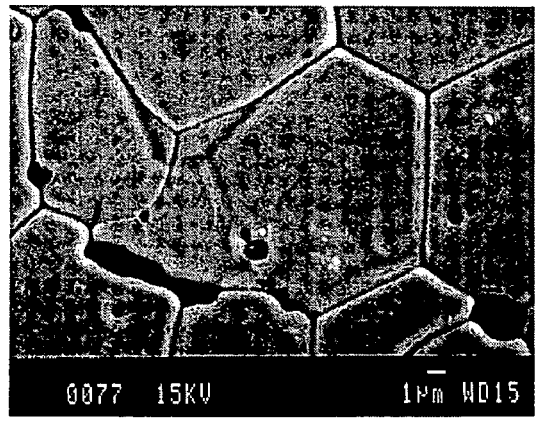
Figure 3:
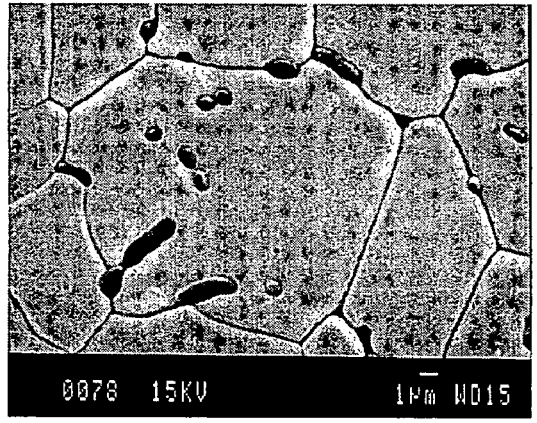
Figure 3:
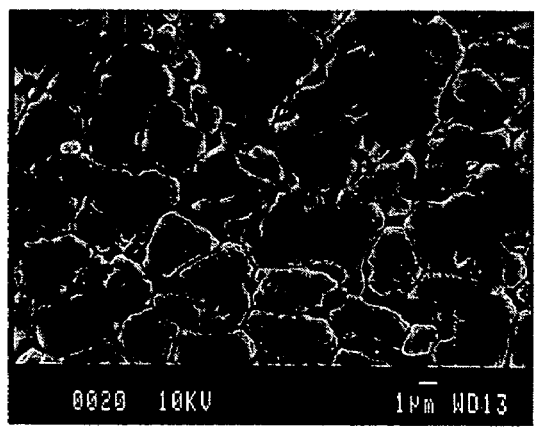
Figure 3:
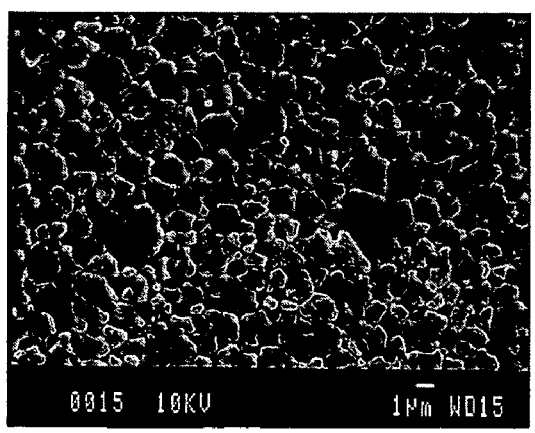
Figure 6:
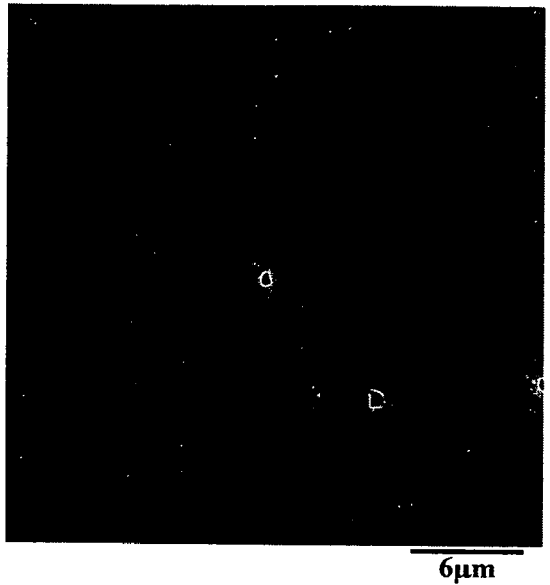
FIG. 6 illustrates the microstructure of ScSZ/$Al_2O_3$ nanocomposites containing varying amounts of $Al_2O_3$.
Figure 6:
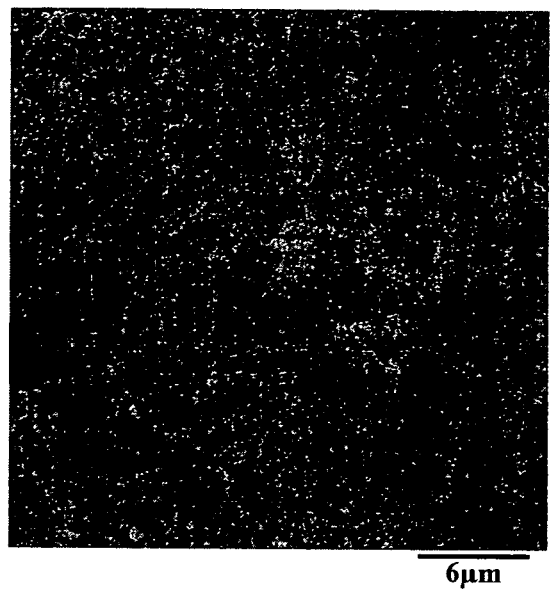
Figure 6:
Figure 6:
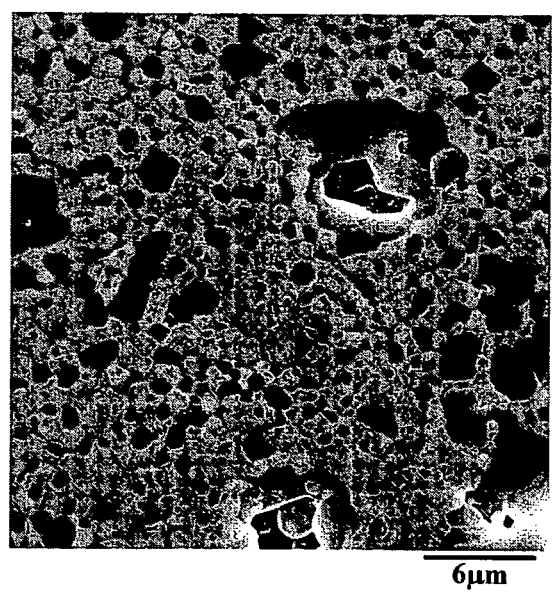

We have found that the heterogeneous doping of chemically stabilized zirconia with a nanosize ceramic dopant material such as $Al_2O_3$ results in a nanocomposite electrolyte having enhanced transport of oxygen ions and an increase in bulk conductivity. By using an inert, heterogeneous, ceramic dopant material such as $Al_2O_3$ which does not dissolve, it remains physically present in the doped specimen as shown in FIGS. 3 and 6. The resulting electrolyte exhibits improved conductivity and high hardness, which makes it ideal for use in solid oxide fuel cells. In addition, the nanocomposite electrolytes of the present invention are lower in cost to produce as they utilize a reduced amount of chemically stabilized zirconia.

It is generally known that the use of a heterogeneous dopant such as $Al_2O_3$ creates a blocking effect, i.e., the transport of oxygen ions is blocked, which can lead to lower conductivity. However, we have discovered that the use of a heterogeneous dopant material, alumina, in a chemically stabilized zirconia matrix unexpectedly leads to an increase in conductivity. While not wishing to be bound to a particular theory, we believe that the creation of space charge regions between the dopant material and the zirconia matrix overcomes the blocking effect of the heterogeneous dopant and enhances the transport of conducting ions. Thus, the resulting nanocomposite electrolyte exhibits enhanced conductivity.

The nanosize ceramic dopant material used in the present invention is preferably selected from $Al_2O_3$, $TiO_2$, MgO, BN, and $Si_3N_4$. A preferred ceramic dopant material for use is $Al_2O_3$. The ceramic dopant material is preferably in powder form and has a particle size ranging from about 10 to 1,000 nm.

The chemically stabilized zirconia is also preferably provided in powder form and comprises either yttria stabilized zirconia (YSZ) or scandia stabilized zirconia (ScSZ). The chemically stabilized zirconia preferably has a particle size ranging from about 100 to 10,000 nm.

The ceramic-ceramic nanocomposite electrolyte of the present invention is preferably formed by mixing the chemically stabilized zirconia powder with the nanosize ceramic dopant powder using a mortar and pestle. The mixed powder is then preferably pressed into a disc using a cold isostatic press. The disc is preferably from about 0.01 to 1 cm thick. The disc is then sintered at a temperature of at least about 1200° C. to about 1600° C. for about 2 to 24 hours. The conductivity of the resulting ceramic-ceramic nanocomposite electrolyte ranges from about 0.10 to about 0.50 S/cm at about 600° C. to about 900° C. The nanocomposite electrolyte preferably has an average grain size of from about 0.1 to about 10 μm. The grain size is important to provide mechanical strength and conductivity. An optimum grain size for the nanocomposite electrolyte of the present invention is preferably in the range of about 1-5 microns.

Figure 1:
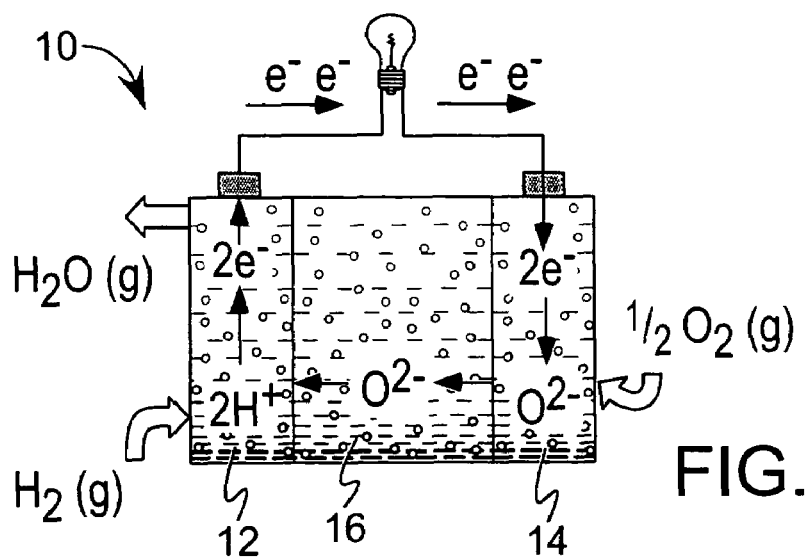
FIG. 1 is a schematic illustration of a solid oxide fuel cell containing the nanocomposite electrolyte of the present invention.

The ceramic-ceramic nanocomposite electrolyte may be incorporated into a fuel cell as shown in FIG. 1. As shown, the fuel cell 10 includes an anode 12 and a cathode 14 with the nanocomposite electrolyte 16 in between. In operation, oxygen ions are generated at cathode 14. The nanocomposite electrolyte 16, due to its high conductivity, rapidly transports the oxygen ions to anode 12. Subsequently, the oxygen reacts with hydrogen to form water at the anode 12. The fuel cell incorporating the nanocomposite electrolyte of the present invention preferably has an operating temperature between about 600° C. to about 1000° C.

In order that the invention may be more readily understood, reference is made to the following examples which are intended to illustrate the invention, but not limit the scope thereof.

EXAMPLE 1

Yttrium stabilized zirconia (YSZ) containing 8 mole % yttrium was obtained from Tosoh Corporation. The YSZ was mixed with nanosize (24 nm) alumina ($Al_2O_3$) obtained from Nanophase Technologies Corporation. The two powders were mixed in various proportions in a mortar and pestle and then subsequently pressed into discs (1.27 cm. in diameter and 0.15 cm thick) with 2.5 ton $cm^{-2}$ pressure and then sintered at 1500° C. to 1520° C. for 4 hours. The densities of the sintered specimens were measured by the Archimedes principle. The results are shown in Table 1. The electrical conductivity of each sample was measured by ac and dc techniques in the 300-975° C. temperature range. For the ac technique, a Solartron 1260 impedance analyzer with 1287 electrochemical interface was used to obtain impedance data in the $0.1$-$10^6$ Hz frequency range. The specimen with the highest density for a given composition (corresponding to a sintering temperature of 1520° C.) was characterized by the ac technique. The two surfaces of each specimen were covered with platinum foils and placed in a cell fixture under a pressure applied by tightening the screw of the cell fixture. The assembled cell fixture was placed in a furnace and an impedance measurement was conducted as a function of temperature. The dc resistances of these specimens were also measured as a function of temperature using a Fluke multimeter.

TABLE 1

Compositions and Densities of Specimens of 8 mol % YSZ doped with different percentages of $Al_2O_3$

| $Al_2O_3$ (Wt. %) | $Al_2O_3$ (Mol. %) | Density (g/cm³) 1500° C. | Density (g/cm³) 1520° C. | Theoretical density (g/cm³) |
|---|---|---|---|---|
| 0 | 0 | 5.83 | 5.96 | 5.96 |
| 2 | 2.56 | 5.59 | 5.92 | 5.92 |
| 4 | 5.10 | 5.41 | 5.77 | 5.88 |

TABLE 1-continued

Compositions and Densities of Specimens of 8 mol % YSZ doped with different percentages of $Al_2O_3$

| $Al_2O_3$ (Wt. %) | $Al_2O_3$ (Mol. %) | Density (g/cm³) 1500° C. | Density (g/cm³) 1520° C. | Theoretical density (g/cm³) |
|---|---|---|---|---|
| 6 | 7.60 | 5.25 | 5.67 | 5.84 |
| 10 | 12.53 | 5.04 | 5.50 | 5.76 |
| 15 | 18.53 | 4.86 | 5.18 | 5.66 |
| 20 | 24.37 | 4.75 | 5.02 | 5.56 |

Figure 2:
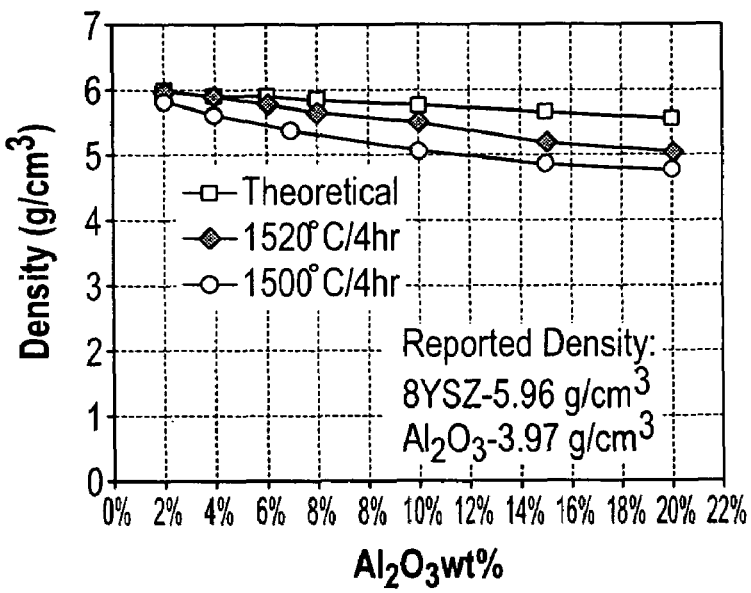
FIG. 2 is a graph illustrating the density of YSZ vs. wt % of $Al_2O_3$.

FIG. 2 illustrates plots of theoretical and experimental densities of the sintered specimens as a function of $Al_2O_3$ concentration. As the density of $Al_2O_3$ is lower than the density of YSZ, densities of all doped specimens decrease with the increased concentration of the dopant. An increase in sintering temperature of 20° C. leads to significant enhancement in density over 90% of the theoretical density. It was noted that at a 20% dopant level, the electrolyte density was reduced over 16%, which is expected to have a positive effect on the power densities of fuel cell stacks containing such doped electrolytes because for the same power output of the fuel cell, the weight of the electrolyte will be reduced.

The microstructures of five specimens containing 0, 4, 6, 10 and 20 wt % $Al_2O_3$ are illustrated in FIGS. 3(a-e), respectively. The illustrated microstructures were investigated by scanning electron microscopy (SEM, JEOL Model JSM-840) conducted on polished and thermally etched surfaces, and the average grain size was determined by counting the grains and dividing the area. The illustrated microstructure of the undoped YSZ shown in FIG. 3(a) is typical of the material and shows the presence of pores within the grains. These pores appear as dark, concave spherical regions in the drawing figure. The grain boundaries are distinct and do not exhibit the presence of an excessive, segregated impurity phase. With the addition of 4 wt % $Al_2O_3$, grain growth occurred and the $Al_2O_3$ phase segregated at the grain boundaries as shown by the dark areas (FIG. 3(b)). The $Al_2O_3$ precipitates can also be observed inside the grains. The structure of the grain boundaries in FIG. 3(b) suggests that they have been re-formed. Increasing the $Al_2O_3$ concentration to 6% leads to further grain growth (FIG. 3(c)) and the presence of the $Al_2O_3$ phase along the grain boundaries and grain cavity. The presence of $Al_2O_3$ in cavities is characterized by convex surfaces. As the concentration of $Al_2O_3$ was increased to 10 wt %, there was a substantial increase in the volume fraction of this phase (FIG. 3(d)) which exists at grain boundaries and also as distinct grains. The average grain size of the YSZ has been reduced. The 20 wt % $Al_2O_3$ specimen (FIG. 3(e)) shows further reduction in the average grain size and the microstructure is on the threshold of transitioning into a nanostructure.

Figure 4:
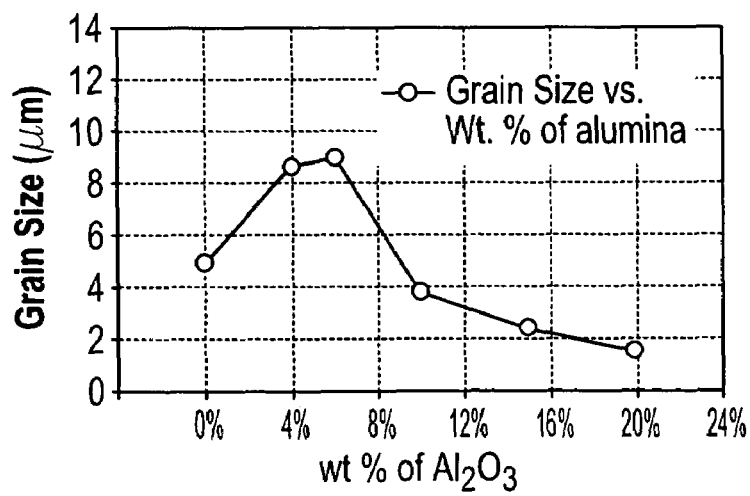
FIG. 4 is a graph illustrating grain size vs. $Al_2O_3$ content.

FIG. 4 illustrates the average grain size as a function of $Al_2O_3$ concentration. As stated previously, the YSZ grain growth occurs up to about 6 wt %, which is believed to have occurred because nanosize $Al_2O_3$ was introduced to the YSZ. The size of $Al_2O_3$ along the grain boundary in the order of several microns as shown in FIGS. 3(b-c) may have formed by dissolution, precipitation, and coarsening. As shown in FIGS. 3(d-e), further addition of $Al_2O_3$ of up to 20 wt % retards grain growth. The 20 wt % $Al_2O_3$ material exhibits a morphology with an average grain size of 1.4 µm. Generally, it may be concluded that at significant concentration of the dopant phase, the grain growth of YSZ is impeded. Grain growth may also be influenced by sintering temp., such as heating and cooling rates, and soaking temperature.

In addition, X-ray diffraction patterns were obtained from undoped and doped (4, 10 and 20%) YSZ. The d-spacings of the specimens demonstrated that the specimens are basically mechanical mixtures of the two components and comply with the definition of heterogeneous doping.

Conductivity

Figure 5:
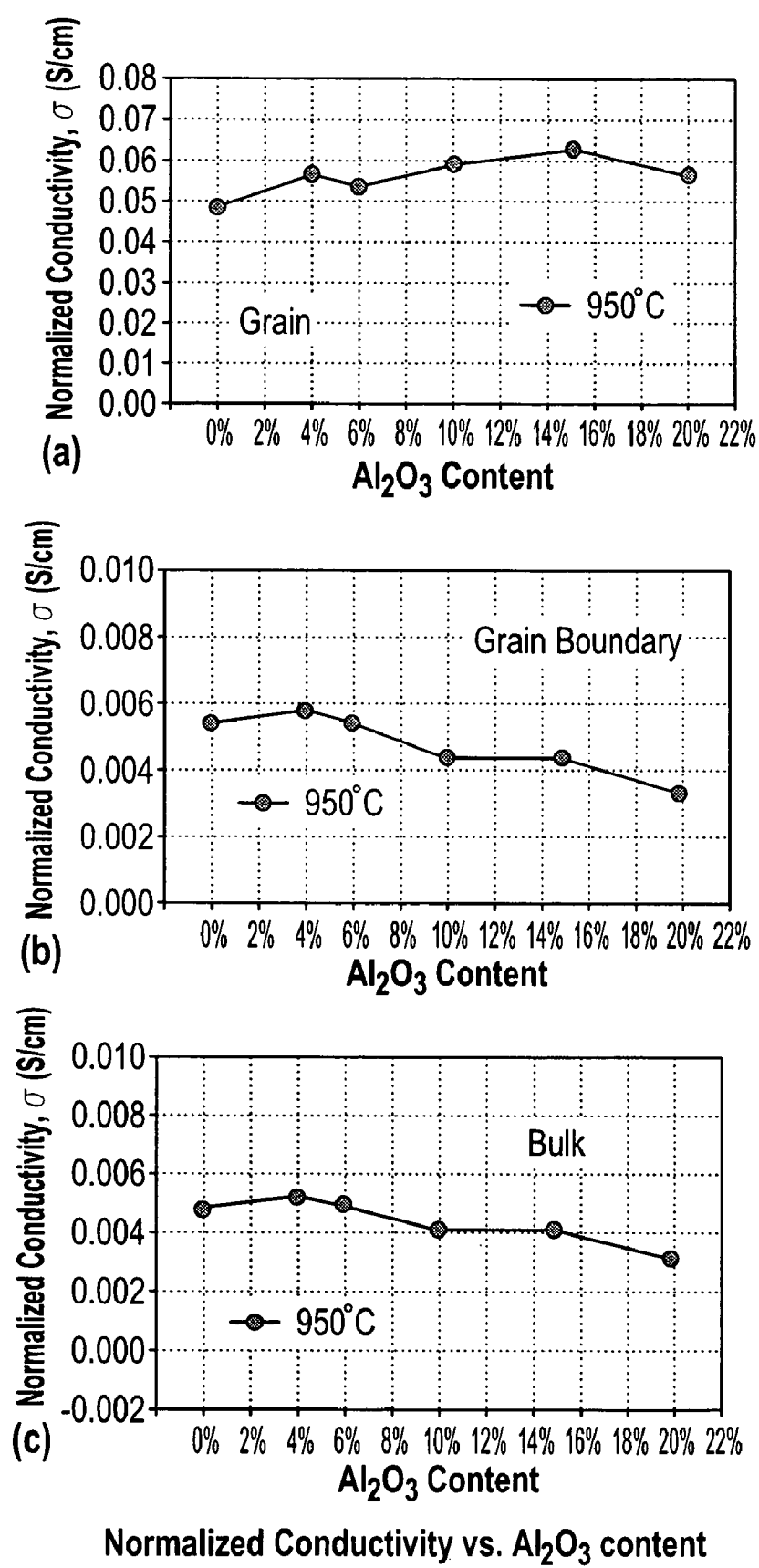
FIGS. 5(a) to 5(c) illustrate normalized conductivity vs. $Al_2O_3$ content.

FIG. 5 illustrates a normalized plot of conductivity (grain conductivity, grain boundary conductivity, and total (bulk) conductivity) vs. $Al_2O_3$ content to demonstrate the effect of the $Al_2O_3$ additions. As shown, the normalized grain conductivity shows an enhancement reaching a peak at around 15 wt % $Al_2O_3$. The conductivity enhancement is about 30%. The normalized grain boundary conductivity increases initially up to about 4 wt % $Al_2O_3$ and then gradually decreases. The grain boundary conductivity is lower than the grain conductivity by a factor of 10-15. The bulk conductivity shows a trend similar to the grain boundary conductivity.

Because the doping phase, alumina, is an insulating material, it would have been expected to have blocked transport of oxygen ions, but there is no evidence of a precipitous drop in conductivity. Rather, in the investigated concentration range of alumina, the increasing conductivity, although small, suggests that the alumina dopant is beneficial to conductivity.

EXAMPLE 2

Scandia stabilized zirconia (ScSZ) (6 mol %) was obtained from Tosoh Corporation and nanosize (24 nm) $Al_2O_3$ powder was obtained from Nanophase Technologies Corporation. The two powders were mixed in various proportions (0, 10, 20 and 30 wt % $Al_2O_3$) in a mortar and pestle. Cylindrical specimens of different compositions of powders were pressed in a cold isostatic press at 3 ton/cm² pressure using collapsable tygon tubes. The cylindrical specimens were heated at a rate of 20° C./min. to 1520° C. in air and kept at this temperature for 4 hours and then cooled at a rate of 20° C./min. to 950° C. and kept there for 1 hour before they were finally allowed to cool in the furnace to room temperature by shutting off the power to the furnace. This procedure was followed to minimize the $Al_2O_3$ particle coarsening during heating and to have high cooling rates during cooling. Several discs of 0.5 mm thickness were cut using a diamond saw from these cylindrical specimens.

The density of the samples was determined using Archimedes principle. One set of discs were polished and thermally etched and carbon coated by thermal evaporation for microstructural analysis using a Leica FE 960 scanning electron microscope (SEM). Similarly polished samples were also used for the hardness measurement using a Vickers hardness tester. Another set of discs were used to collect x-ray diffraction data using a Rigaku Rotaflex RV-200BH x-ray diffractometer operated at 40 KV, 150 mA current with a copper target.

AC imepedance spectroscopy measurements in the 0.1 to $10^6$ HZ frequency range were taken on three different sets of discs of each composition using a Solatron 1260 impedance analyzer with 1287 electrochemical interface. The ac impedance data was collected at several temperatures ranging from 300-950° C. For electrical conductivity measurements, the discs were coated on both sides of the sample with platinum paste and then annealed in a furnace at 1000° C. in air for one hour and then allowed to cool inside the furnace. Platinum foils were also used on both sides of the sample to improve the contact resistance. The fixture used in this example comprised a machined glass-ceramic macor screw and a socket design that can be tightened to apply good contact between the electrodes and the samples. The sample along with the fixture was inserted into a tube furnace and the data was collected at several temperatures after stabilizing for 15 minutes at each temperature. The thermocouple was placed as close as possible to the fixture in each measurement to make sure the temperature measurement was accurate.

The calculated and measured density of the 6ScSZ and $Al_2O_3$ composite samples are shown in Table 2.

TABLE 2

Calculated and measured density of 6 ScSZ doped with different percentages of $Al_2O_3$

| $Al_2O_3$ (Wt. %) | $Al_2O_3$ (Mol. %) | Measured Density (g/cm³) | Theoretical Density (g/cm³) | % of Theoretical density (g/cm³) |
|---|---|---|---|---|
| 0 | 0 | 5.82 | 5.87 | 99.15 |
| 10 | 11.91 | 5.36 | 5.68 | 94.37 |
| 20 | 23.3 | 5.205 | 5.49 | 94.81 |
| 30 | 34.26 | 5.03 | 5.31 | 94.73 |

It is noted that with an increase in the amount of $Al_2O_3$, the measured density of the composites was slightly lower than the undoped specimen. In addition, the measured densities are also lower than the theoretical densities for similar compositions. However, since a density greater than 94% of the theoretical values is achieved even with the use of 30 wt % $Al_2O_3$, it is not thought to be a problem for use in practical applications.

It was further noted that all of the samples in this example exhibited high strength so that repeated measurements on a single sample were made without fracturing the samples. Table 3 illustrates the average values of Vickers hardness data collected from the polished samples. It was noted that no degradation in the hardness was observed even after 30% of 6ScSZ was replaced with $Al_2O_3$.

TABLE 3

Vickers hardness measurements taken from the samples (the values shown are the average of 3 measurements)
Load applied - 1 Kgf

| Sample | Hardness Value (HV/1) |
|---|---|
| Undoped ScSZ | 1398 |
| ScSZ + 1% Alumina | 1365 |
| ScSZ + 5% Alumina | 1387 |
| ScSZ + 10% Alumina | 1337 |
| ScSZ + 20% Alumina | 1373 |
| ScSZ + 30% Alumina | 1366 |

FIGS. 6(a-d) illustrate the microstructure of the samples. The illustrated microstructures were obtained by scanning electron microscopy (SEM, JEOL Model JSM-840) conducted on polished and thermally etched surfaces. Dense microstructure with very little porosity was observed in all of the samples.

Figure 7:
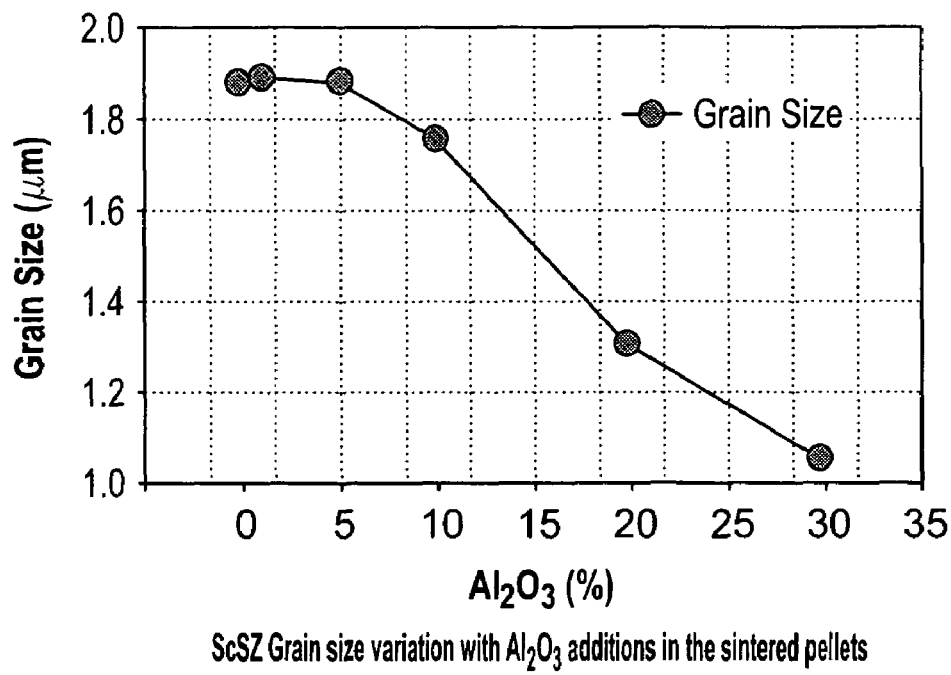
FIG. 7 is a graph illustrating ScSZ grain size variation with $Al_2O_3$ additions.

While some of the $Al_2O_3$ particles (dark contrast) were observed to be present at the grain boundaries in the composite samples, occasionally some particles were also found to be entrapped inside the grains. A reduction in grain size by a factor of 3 was observed in 6 ScSZ+30% $Al_2O_3$ composites compared with undoped 6ScSZ samples. Variation in ScSZ grain size with the $Al_2O_3$ additions is shown in FIG. 7. The size is reduced to about 1.0 micron at higher levels of $Al_2O_3$ doping. Although nanometer sized $Al_2O_3$ was used, a wide distribution of grain size in $Al_2O_3$ particles was observed in 6ScSZ+20% $Al_2O_3$ and 6ScSZ+30% $Al_2O_3$ composites. The average grain size of $Al_2O_3$ was about 1 micron.

Conductivity

Figure 8:
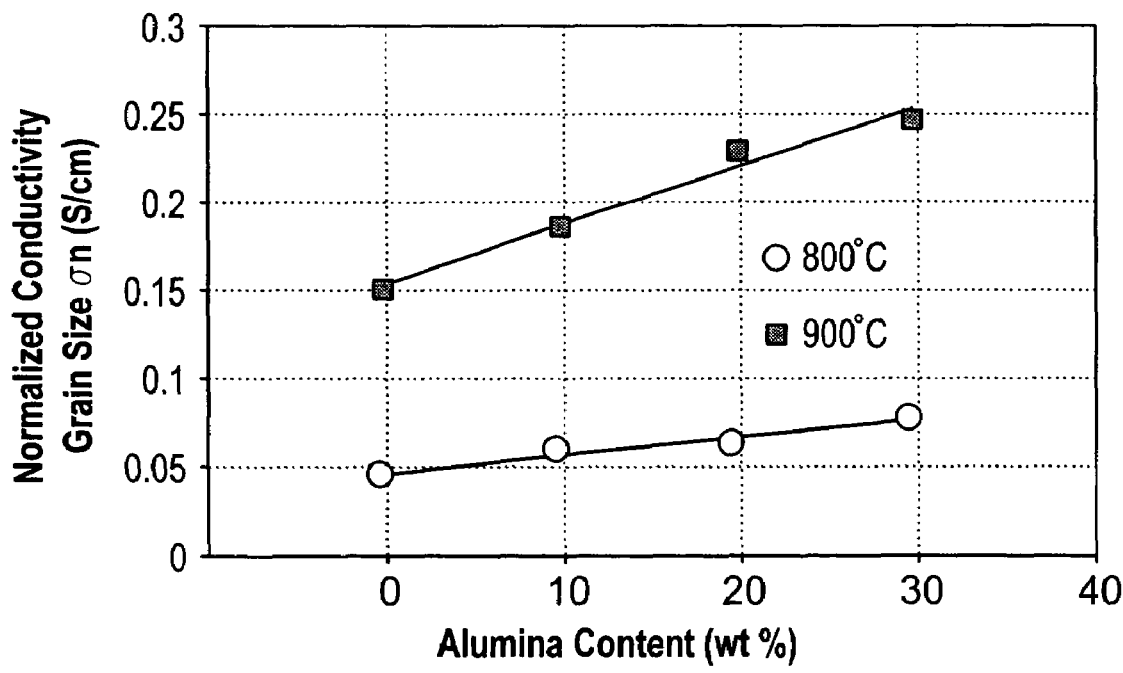
FIG. 8 illustrates the average conductivity of ScSZ/$Al_2O_3$ nanocomposite samples containing varying amounts of $Al_2O_3$.

FIG. 8 shows the average conductivity of the samples measured at 800° C. and 900° C. as a function of $Al_2O_3$ concentration. In the calculations of the conductivity data, the total cross-section of the samples was taken into consideration. It should be noted that the conductivity data has been corrected for the conducting phase of ScSZ materials in the composites (normalized conductivity). As shown, there is an improvement in conductivity with the $Al_2O_3$ additions. The improved conductivity is believed to be due to the formation of space charge regions and enhanced mobility of the conducting ions.

Having described the invention in detail and by reference to preferred embodiments thereof, it will be apparent that modifications and variations are possible without departing from the scope of the invention.

What is claimed is:

1. A ceramic-ceramic nanocomposite electrolyte comprising fully chemically stabilized zirconia and about 10% by weight to about 48% by weight of a nanosize ceramic dopant material selected from $Al_2O_3$, $TiO_2$, MgO, BN, and $Si_3N_4$; wherein said nanocomposite electrolyte has a heterogeneous microstructure in which said ceramic dopant material is undissolved and physically distinct from said zirconia in said microstructure, and wherein space charge regions are present at the grain boundary of said ceramic dopant material and said fully chemically stabilized zirconia.

2. The nanocomposite electrolyte of claim 1 wherein said chemically stabilized zirconia is selected from yttria stabilized zirconia and scandia stabilized zirconia.

3. The nanocomposite electrolyte of claim 1 wherein said nanosize ceramic dopant material comprises $Al_2O_3$.

4. The nanocomposite electrolyte of claim 1 comprising from about 52% to about 90% by weight of said chemically stabilized zirconia and from about 10% to about 48% by weight of said nanosize ceramic dopant material.

5. The nanocomposite electrolyte of claim 2 comprising from about 60 to about 90% by weight yttria stabilized zirconia and from about 10 to about 40% by weight $Al_2O_3$.

6. The nanocomposite electrolyte of claim 2 comprising from about 60 to about 90% by weight scandia stabilized zirconia and from about 10 to 40% by weight $Al_2O_3$.

7. The nanocomposite electrolyte of claim 1 having a bulk conductivity of from about 0.10 to about 0.50 S/cm at about 600° C. to 900° C.

8. The nanocomposite electrolyte of claim 1 having an average grain size of from about 0.1 to about 10 μm.

9. A solid oxide fuel cell containing the nanocomposite electrolyte of claim 1.

10. The solid oxide fuel cell of claim 9 having an operating temperature of from about 600° C. to 950° C.

11. A method of making a ceramic-ceramic nanocomposite electrolyte comprising:
providing fully chemically stabilized zirconia;
heterogeneously doping said chemically stabilized zirconia with about 10% by weight to about 48% by weight of a ceramic dopant material which is not dissolved such that said nanocomposite electrolyte has a heterogeneous microstructure in which said ceramic dopant material remains physically distinct from said zirconia in said microstructure, and wherein space charge regions are present at the grain boundary of said ceramic dopant material and said fully chemically stabilized zirconia.

12. The method of claim 11 wherein said chemically stabilized zirconia is selected from yttria stabilized zirconia and scandia stabilized zirconia.

13. The method of claim 11 wherein said ceramic dopant material is selected from the group consisting of $Al_2O_3$, $TiO_2$, MgO, BN, and $Si_3N_4$.

14. The method of claim 13 wherein said ceramic dopant material comprises $Al_2O_3$.

15. The method of claim 14 wherein said chemically stabilized zirconia comprises from about 60 to about 90% by weight yttria stabilized zirconia and said ceramic dopant material comprises from about 10 to about 40% by weight $Al_2O_3$.

16. The method of claim 14 composite electrolyte wherein said chemically stabilized zirconia comprises from about 60 to about 90% by weight scandia stabilized zirconia and said ceramic dopant material comprises from about 10 to about 40% by weight $Al_2O_3$.

17. The method of claim 11 including pressing said doped chemically stabilized zirconia into a disc.

18. The method of claim 17 including sintering said disc at a temperature of at least 1200° C. to 1600° C.

19. The method of claim 11 wherein said chemically stabilized zirconia is doped with about 20% by weight of said ceramic dopant material to retard the grain growth of said chemically stabilized zirconia.

20. A heterogeneously doped chemically stabilized zirconia having an average grain size of from about 0.1 to about 10 μm and a bulk conductivity of from about 0.10 to about 0.50 S/cm at about 600° C. to 900° C.

21. The ceramic-ceramic nanocomposite of claim 2 comprising at least 6 mol % scandia stabilized zirconia or at least 8 mol % yttria stabilized zirconia.

22. The method of claim 12 comprising at least 6 mol % scandia stabilized zirconia or at least 8 mol % yttria stabilized zirconia.

23. A solid oxide fuel cell containing a ceramic-ceramic nanocomposite electrolyte comprising fully chemically stabilized zirconia and a nanosize ceramic dopant material selected from $Al_2O_3$, $TiO_2$, MgO, BN, and $Si_3N_4$; wherein said nanocomposite electrolyte has a heterogeneous microstructure in which said ceramic dopant material is undissolved and physically distinct from said zirconia in said microstructure.

* * * * *